(12) United States Patent
Agrahari et al.

(10) Patent No.: US 7,959,197 B2
(45) Date of Patent: Jun. 14, 2011

(54) BUMPER BEAM WITH MULTI-CONCAVITY-DEFINING CROSS SECTION

(75) Inventors: Shailesh K. Agrahari, Holland, MI (US); Devesh Soni, Maharashira (IN); Gowher Qadri, Maharashira (IN); Dhiraj Uikey, West Bloomfield, MI (US)

(73) Assignee: Shape Corp., Grand Haven, MI (US)

( * ) Notice: Subject to any disclaimer, the term of this patent is extended or adjusted under 35 U.S.C. 154(b) by 0 days.

(21) Appl. No.: 12/607,523

(22) Filed: Oct. 28, 2009

(65) Prior Publication Data
US 2010/0109354 A1 May 6, 2010

Related U.S. Application Data

(60) Provisional application No. 61/109,683, filed on Oct. 30, 2008.

(51) Int. Cl.
*B60R 19/02* (2006.01)
(52) U.S. Cl. ......... 293/102; 293/120; 293/132; 293/133
(58) Field of Classification Search .................. 293/102, 293/120, 132, 133
See application file for complete search history.

(56) References Cited

U.S. PATENT DOCUMENTS

| | | | |
|---|---|---|---|
| 4,076,295 A | 2/1978 | Gutman | |
| 4,826,226 A | 5/1989 | Klie et al. | |
| 5,780,129 A | 7/1998 | Ohta | |
| 6,217,089 B1 | 4/2001 | Goto et al. | |
| 6,398,275 B1 | 6/2002 | Hartel et al. | |
| 6,540,275 B1 | 4/2003 | Iwamoto et al. | |
| 6,634,702 B1 | 10/2003 | Pleschke et al. | |
| 6,663,151 B2 | 12/2003 | Mansoor et al. | |
| 6,945,348 B2 | 9/2005 | Henderson et al. | |
| 6,971,690 B2 * | 12/2005 | Evans et al. | 293/102 |
| 6,971,692 B2 | 12/2005 | Gioia et al. | |
| 7,165,794 B2 | 1/2007 | Banry et al. | |
| 7,192,068 B1 | 3/2007 | Kim | |
| 7,226,097 B2 | 6/2007 | Adachi et al. | |
| 7,287,809 B2 | 10/2007 | Andre | |
| 7,296,833 B2 | 11/2007 | Mohapatra et al. | |

(Continued)

FOREIGN PATENT DOCUMENTS
KR 1019970039259 7/1997

OTHER PUBLICATIONS

U.S. Patent Application Publication No. 2008/0203740 entitled "Bumper Beam for a Motor Vehicle," Inventor Mellis et al., published Aug. 28, 2008.
U.S. Patent Application Publication No. 2003/0020291 entitled Motor Vehicle Bumper Beam, and a Bumper Fitted With Such a Beam, Inventor Roussel et al., published Jan. 30, 2003.

*Primary Examiner* — Joseph D Pape
(74) *Attorney, Agent, or Firm* — Price, Heneveld, Cooper, DeWitt & Litton, LLP

(57) ABSTRACT

A bumper system includes primary and secondary structural cross beams, at least one having an S-shaped cross section with forwardly-facing (or outwardly-facing) top concavity. The beams include different arrangements of stiffening ribs in concavities formed by the S-shaped cross section for impact and bending strength. In one form, the beams are made of polymeric material. The beams may include integrally formed crush cans for attachment to the vehicle frame, or alternatively can be attached to vehicle frame rail tips by separate metal crush cans and brackets.

16 Claims, 10 Drawing Sheets

U.S. PATENT DOCUMENTS

| | | |
|---|---|---|
| 7,390,039 B2 | 6/2008 | Adachi et al. |
| 7,399,015 B2 | 7/2008 | Patel et al. |
| 7,434,872 B2 | 10/2008 | Steller |
| 2002/0125725 A1* | 9/2002 | Satou .......................... 293/132 |
| 2006/0255601 A1* | 11/2006 | Tamada et al. ................ 293/102 |
| 2007/0046043 A1 | 3/2007 | Ito |
| 2007/0085356 A1 | 4/2007 | Itou et al. |
| 2007/0182171 A1 | 8/2007 | Kageyama et al. |
| 2007/0216198 A1 | 9/2007 | Nakamae et al. |
| 2008/0100096 A1 | 5/2008 | Andre |

* cited by examiner

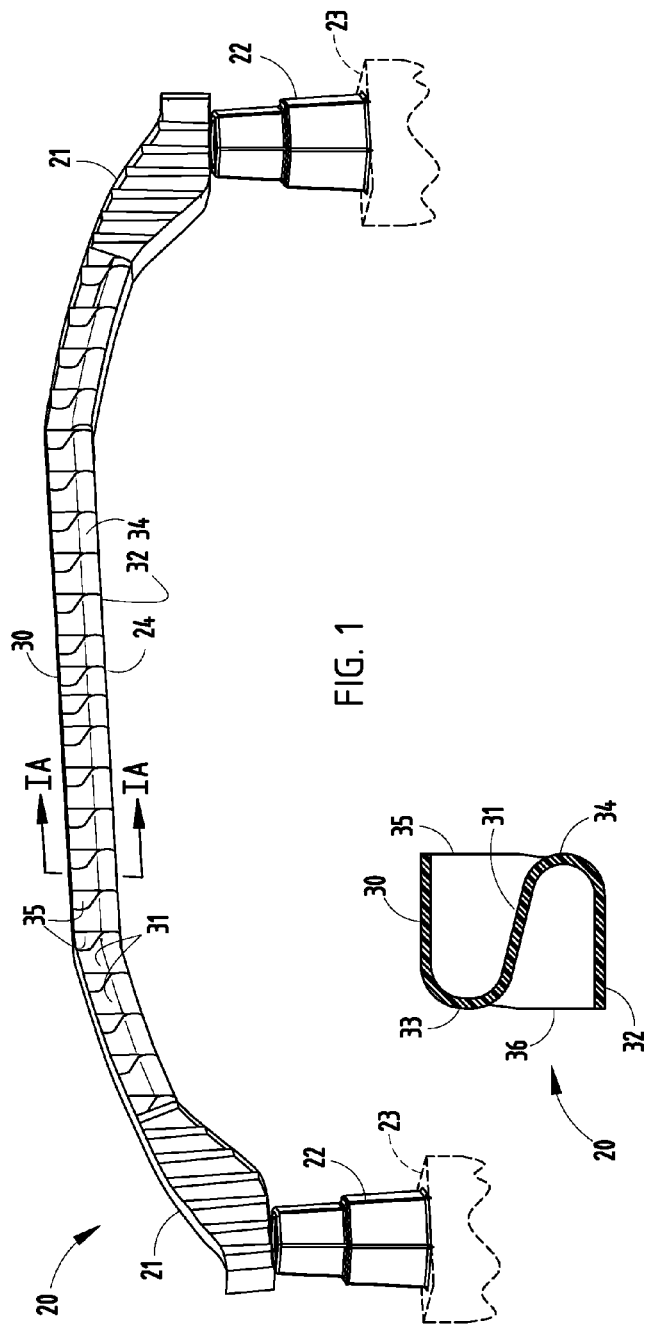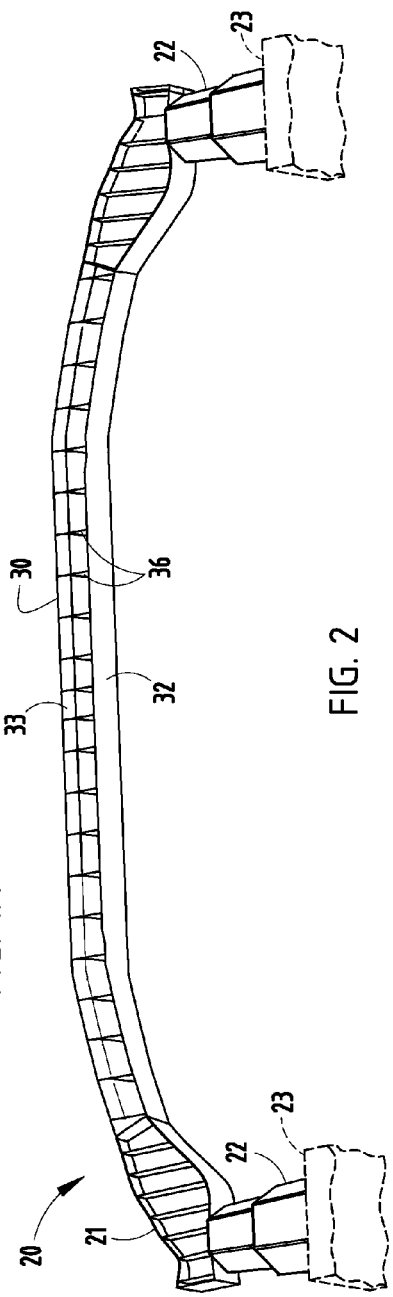

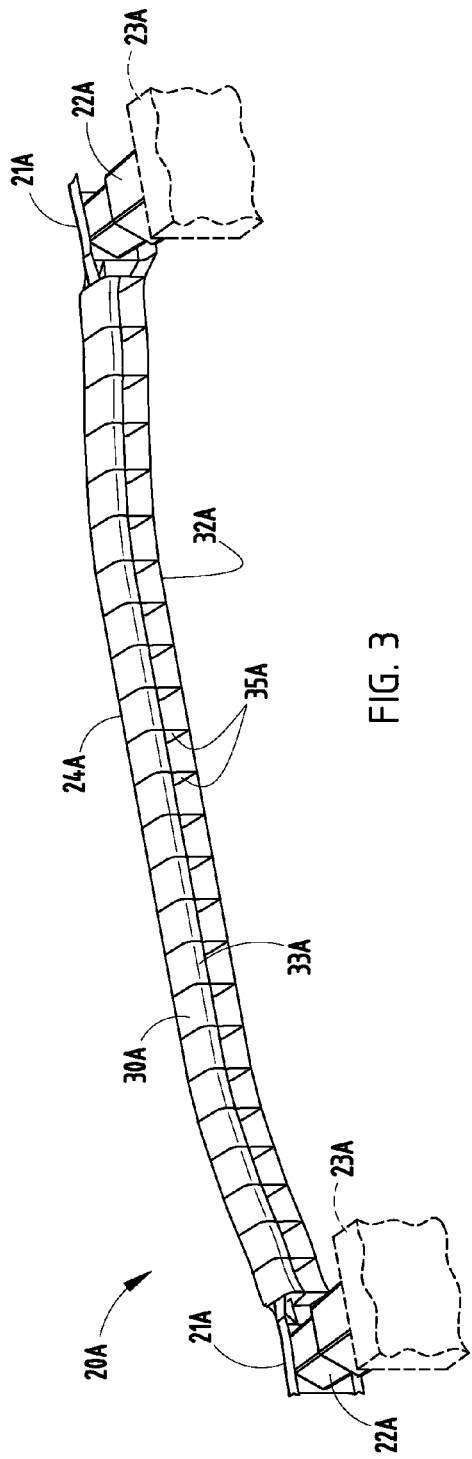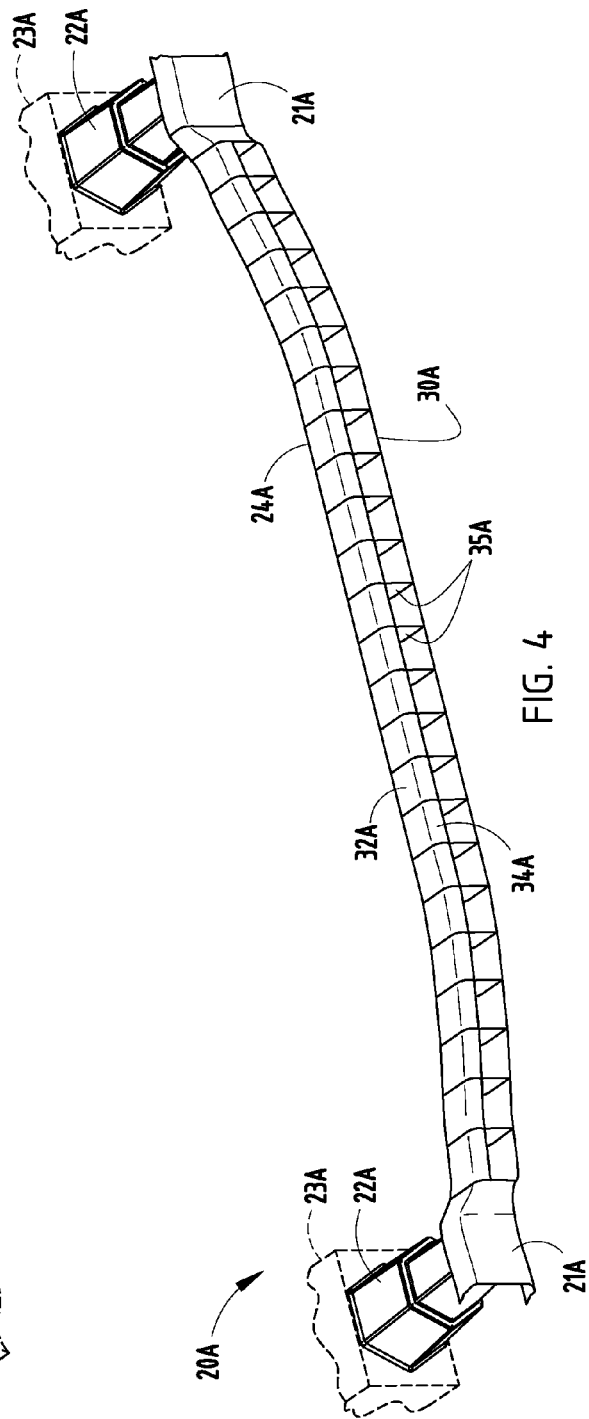

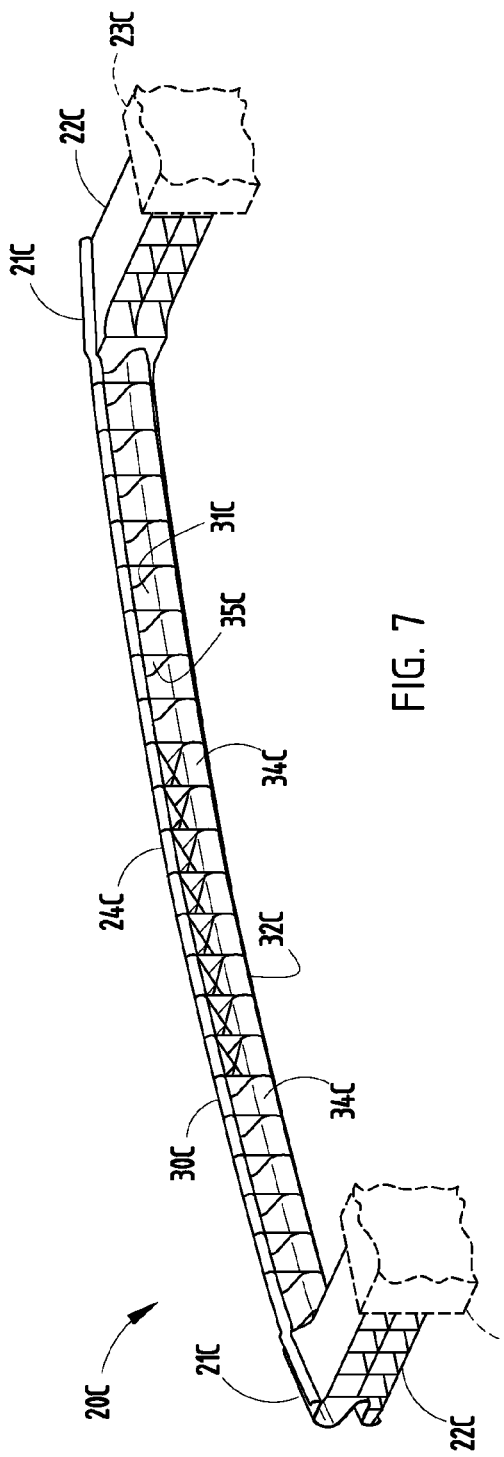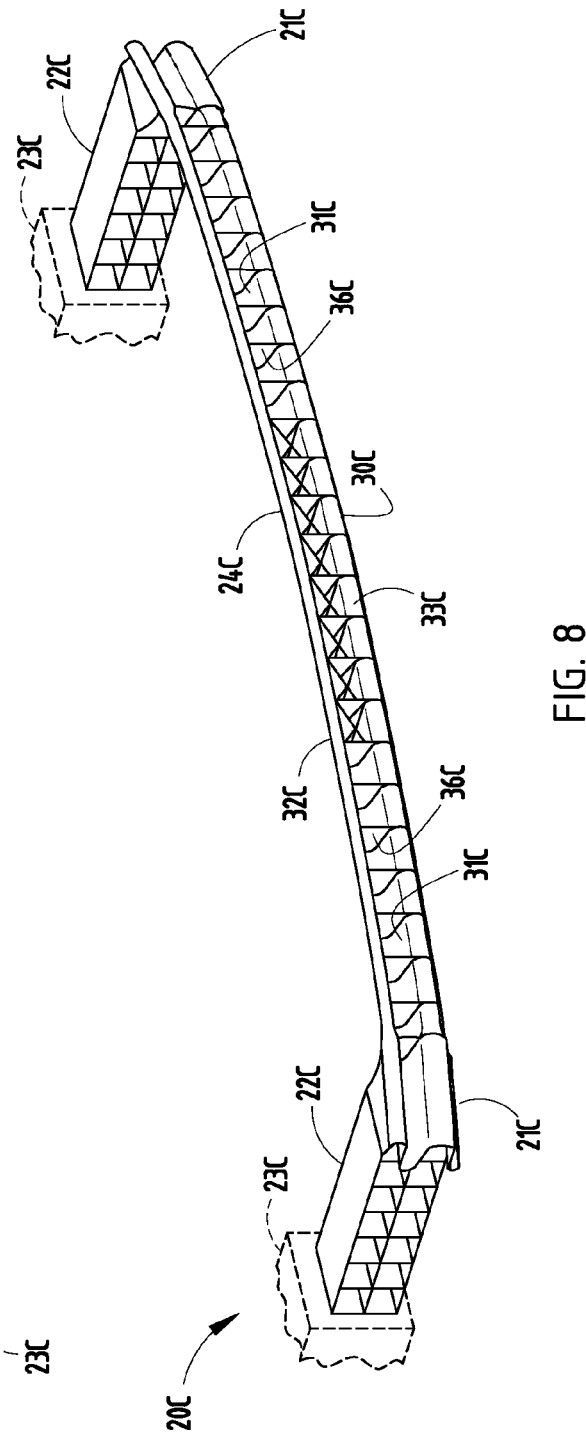
FIG. 7
FIG. 8

| BEAM TYPE | BEAM MASS (g) |
|---|---|
| S-SECTION-HORIZONTAL-FULL LENGTH | 498 |
| S-SECTION-HORIZONTAL-FLAT ENDS | 559 |
| S-SECTION-HORIZONTAL-FULL LENGTH-CROSS RIBS | 613 |
| S-SECTION-VERTICAL | 645 |
| U-SECTION-OPTIMIZED | 668 |
| I-SECTION | 787 |

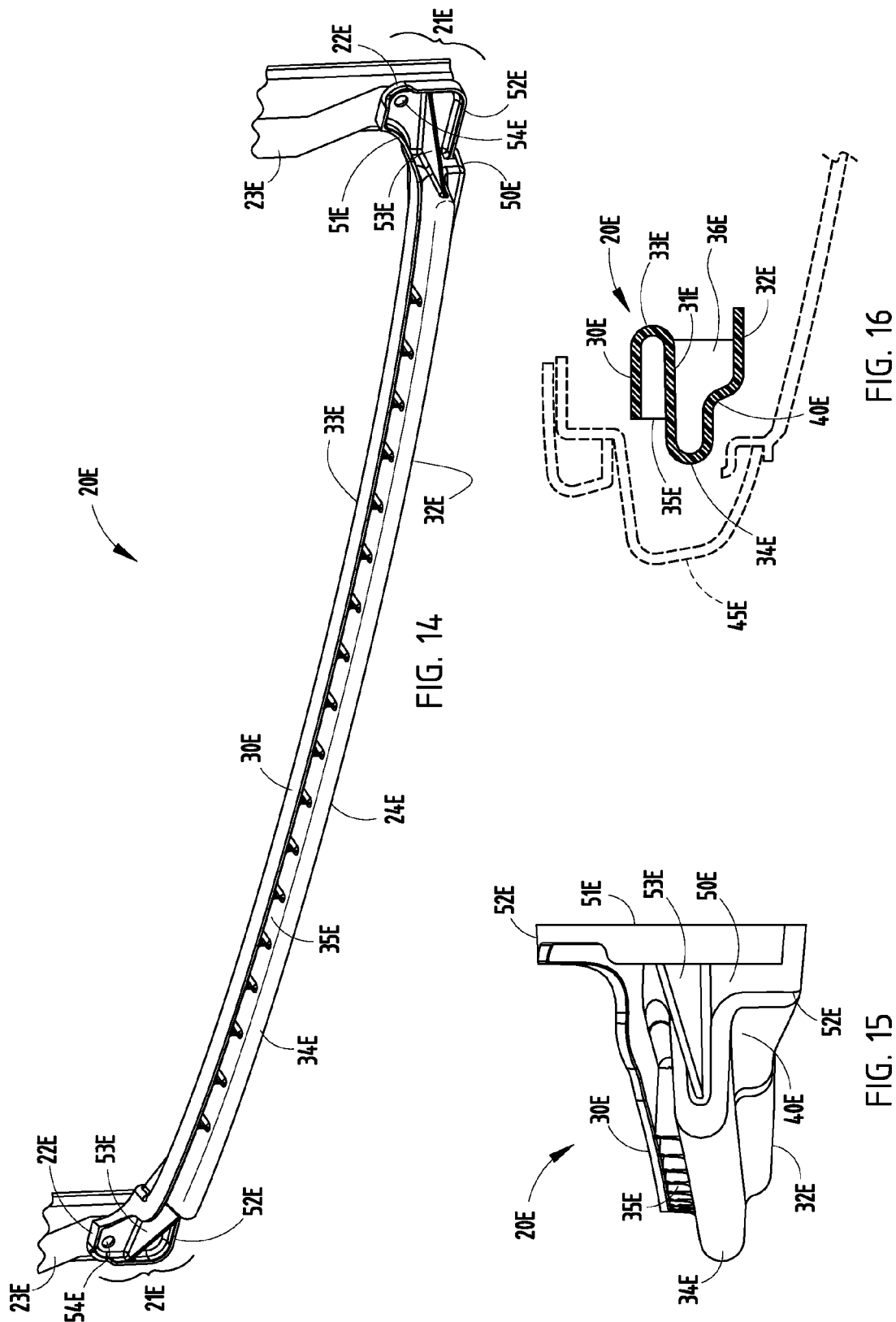

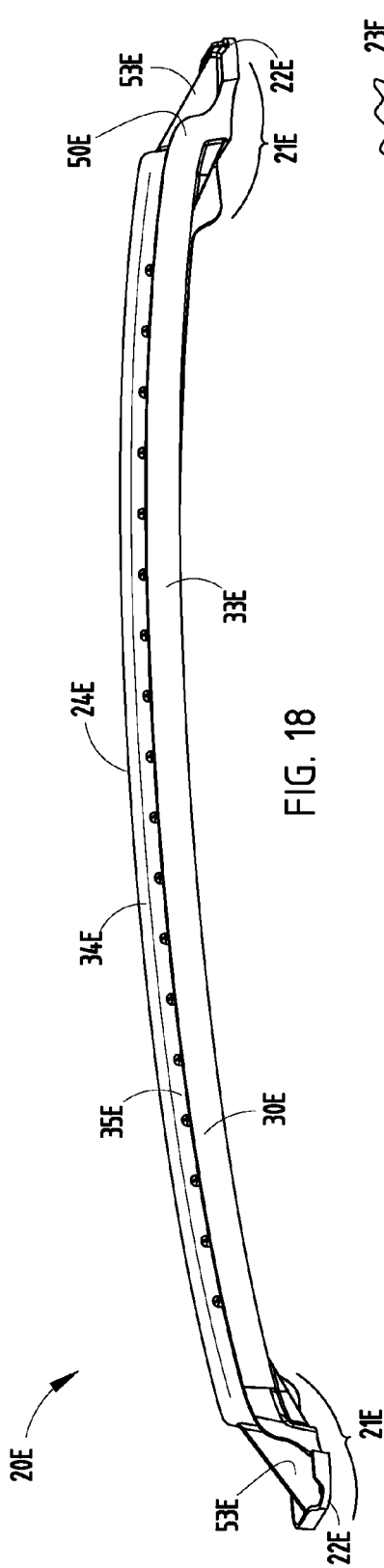
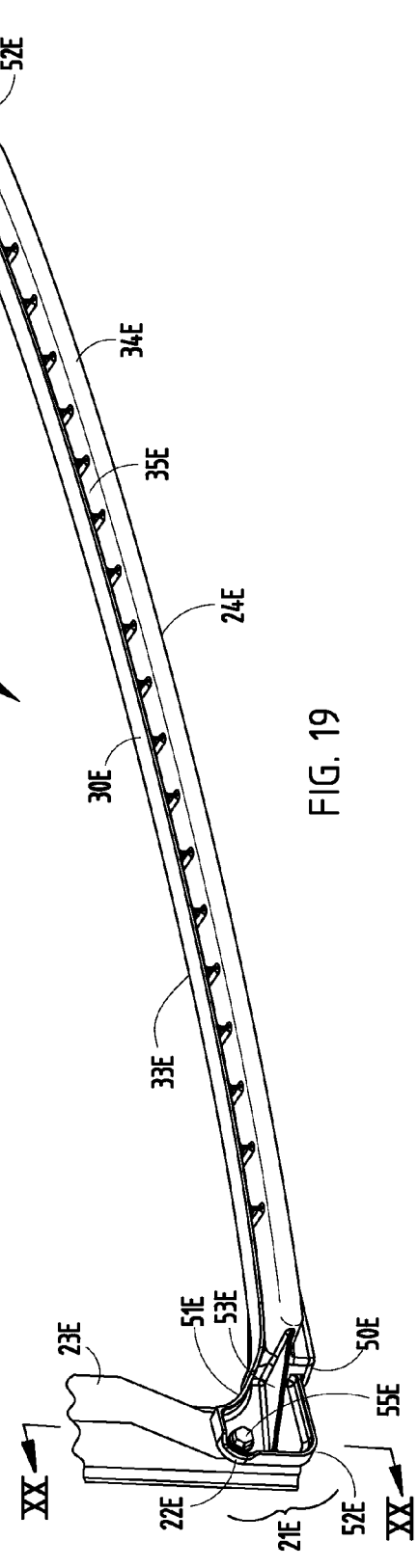
FIG. 18
FIG. 19

BUMPER BEAM WITH MULTI-CONCAVITY-DEFINING CROSS SECTION

CROSS-REFERENCE TO RELATED APPLICATION

This utility application claims the benefit under 35 U.S.C. §119(e) of application Ser. No. 61/109,683, filed Oct. 30, 2008, entitled BUMPER BEAM FOR IMPROVED PEDESTRIAN SAFETY, the entire contents of which are incorporated herein by reference.

BACKGROUND

The present invention relates to a vehicle bumper system for improved bending strength, impact resistance, and pedestrian safety, and more particularly relates to a structural beam having a multi-concavity-defining cross section or an S-shaped cross section across a substantial length of the beam. The beam is particularly useful for primary beams in low weight vehicles and/or as a compliment to the vehicle's primary beam in a pedestrian impact application. The present beam is not believed to be limited to only vehicle front bumpers, nor to only pedestrian safety, but is believed relevant to any structural impact beam where the beam's shape, bending strength, and impact energy absorption during impact/bending is important.

Historically, vehicle front bumper systems were intended to protect vehicles from damage, as well as reduce injury to vehicle passengers. Recently, there has been increased attention directed to pedestrian safety, and in particular to a reduction to leg injury upon being struck by a vehicle. Further, there continues to be very strong competitive pressures to reduce overall cost to bumper systems, to minimize the number and weight of components, and to optimize and distribute energy absorption over an impact stroke, while at the same time maintaining design flexibility and adaptability.

Several factors are important for beams intended for impact resistance and energy absorption. For example, a beam's impact strength to weight ratio is important in order to provide optimal beam strength yet minimum vehicle weight. Also, "efficiency" of the energy absorption is important, where the beam quickly reaches a predetermined value upon being impacted, and then maintains that resistance level for a period of time, yet where peaks and valleys of loading are avoided, and where energy absorption is made predictable and consistent.

SUMMARY OF THE PRESENT INVENTION

In one aspect of the present invention, a bumper system for providing impact resistance on a vehicle frame, comprising a structural beam with end-positioned mounts configured for attachment to the vehicle frame, the cross beam having an S-shaped cross section and having a length that extends about equal to a width of a vehicle.

In another aspect of the present invention, a bumper apparatus includes a primary reinforcement beam designed for major impact collisions against a relatively heavy or stationary object, and a secondary beam designed for pedestrian impact and positioned below the primary reinforcement beam in a position to act as a 'leg catcher' for improved pedestrian safety. The bumper apparatus includes at least one of the primary and secondary beams having an S-shaped cross section and a cross-car width generally matching a vehicle width.

In another aspect of the present invention, a beam apparatus for improved safety comprises a plastic beam having a cross section defining at least two oppositely-facing concavities, and a pair of separate crush cans supporting ends of the beam and adapted for mounting to a vehicle frame in a position for improved impact safety.

In another aspect of the present invention, a vehicle has a vehicle frame and a bumper system for impact against an object. An improvement includes the bumper system having a structural plastic cross beam having a center portion with a length that extends about equal to a width of the vehicle frame and having end portions with attachment structure for securing the cross beam to the vehicle frame, at least one of the end portions and center portion including sets of stiffening ribs, with at least one of the sets defining a triangular shape in a concavity of the beam for distributing stress.

In another aspect of the present invention, a vehicle includes a vehicle frame and a bumper system for impact against an object. The bumper system includes an improvement comprising a structural plastic cross beam having a center portion with a length that extends about equal to a width of the vehicle frame and having end portions with attachment structure for securing the cross beam to the vehicle frame, the attachment structure including at least one quick-attach connector for connecting to the vehicle frame without requiring a separate fastener or tools for assembly.

These and other aspects, objects, and features of the present invention will be understood and appreciated by those skilled in the art upon studying the following specification, claims, and appended drawings.

BRIEF DESCRIPTION OF DRAWINGS

FIGS. 1-2, 3-4, 5-6, 7-8, and 12-13 are front and rear perspective views of different beams with S-shaped cross sections that embody the present invention, and FIG. 1A is a cross section taken along lines IA-IA in FIG. 1, showing the S shaped cross section.

FIGS. 12-13 are described above.

FIG. 14 is a perspective view of a beam designed for improved pedestrian impact.

FIGS. 15-16 are side views of the beam of FIG. 14 mounted in a vehicle bumper system, FIG. 15 showing the overall assembly and FIG. 16 being a cross section through a center of same.

FIG. 18 is a top view of the beam of FIG. 14.

FIG. 19 is a perspective view of the beam in FIG. 18 including attachment structure.

DETAILED DESCRIPTION OF PREFERRED EMBODIMENTS

Figure 5:
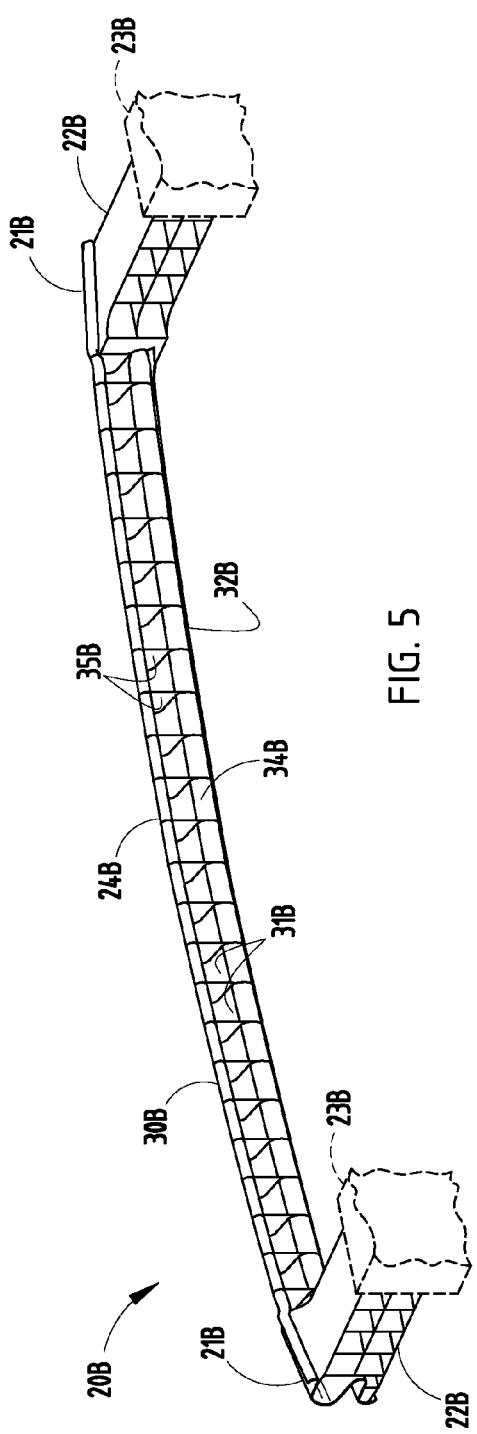
Figure 6:
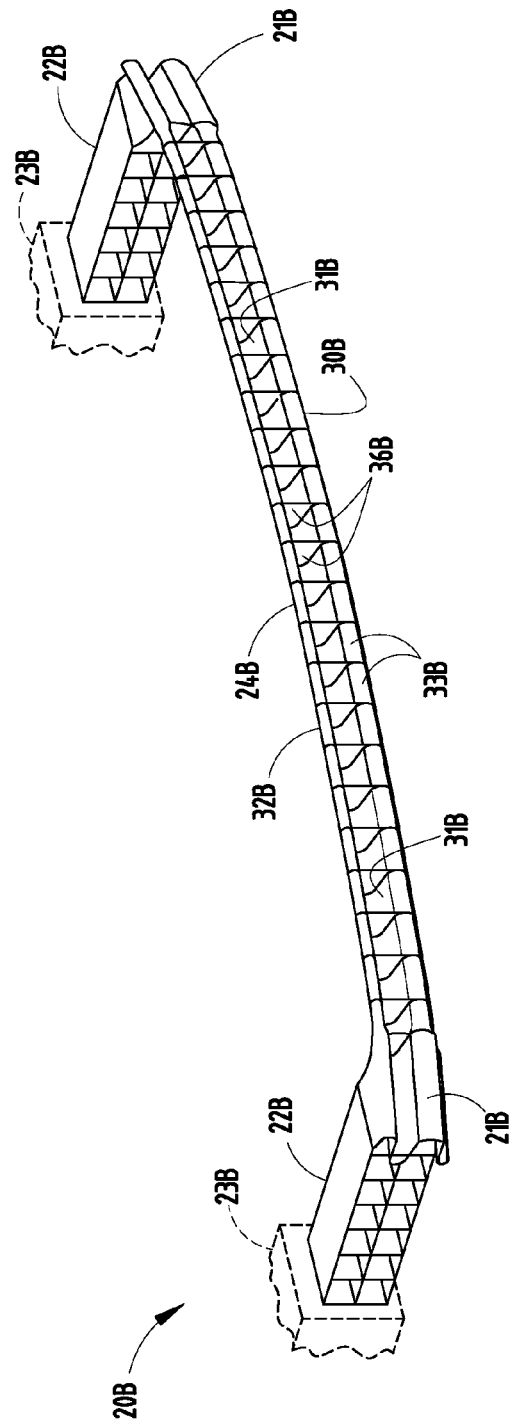

The illustrated beams are structural plastic cross beams for use in a vehicle bumper system. The structural plastic beams have an S-shaped cross section that define forward and rearward facing concavities, but the various beams include different types of transverse stiffening ribs in the concavities formed by the S-shaped cross section. Some beams include an integrally-formed crush can for attachment to the vehicle frame and for supporting the cross beam thereon. Other beams attach to a vehicle frame using separate metal crush cans with ends of the beams configured to attach to the crush cans for mounting on the vehicle frame. The beams are generally longitudinally curved (i.e., "swept") to match an aerodynamic curved shape of a front of a modern passenger vehicle. It is contemplated that a scope of the present inventive concept includes any beam that is a structural cross beam with forwardly-facing (outwardly-facing from the vehicle) concavity (primary beam or secondary beam), or a beam having an S-shaped cross section, or a beam that is adapted for positioning below a primary bumper reinforcement beam on a vehicle for use as a "leg catcher" on the vehicle for improved pedestrian safety.

Some beams include an integrally-formed attachment portion that can attach directly to the vehicle frame and for supporting the cross beam. Other beams attach to a vehicle frame using a crush can, either metal or plastic, in the design. At the transition from the cross beam to these attachment portions, there is a section that incorporates a rib structure that can take on several design forms. These ribs allow for the distribution of forces from the cross beam to the attachments or crush cans. The ribs stiffen their respective beams, by providing additional structure and stiffness to the horizontal walls, but also by preventing premature opening of the concavity during an impact.

Various beams with different cross sections were tested, such as U- and I- and W-shaped sections, but the S-shaped section with cross ribs outperformed them in terms of impact strength and lighter weight and strength-to-weight ratio. When mass and performance results were combined, in our opinion, clearly the S section beams gave better results in terms of bending strength per unit weight than the other plastic beams tested. It is noted that, in addition to the physical testing, a theoretical calculation was performed. From these calculations, the maximum bending moment of the cross beam was calculated. This calculated bending moment shows that the S section cross beam has a higher value than the W section cross beam. When a weight of the S section cross beam is considered versus the W section cross beam, the comparison is even more favorable to the S section cross beam.

The metal crush cans further provide and supplement the benefits of the beams tested. In particular, testing showed that performance of plastic beams was affected by the attachment of brackets/crush cans to the beam as well as in regard to movement of a back plate attached to the plastic beams. Plastic crush cans were very flexible, and the back plate of the plastic crush cans potentially pulled loose, causing problems of zero resistance load at certain times during the impact force-deflection curves. The data suggested that metal crush cans matched with S shaped beams had optimal results. Nonetheless, it is contemplated that the crush cans can be made of plastic, and can be integrally formed, to have good energy-absorbing crush characteristics and structural characteristics for particular applications when mounting the beam to a vehicle frame. Care must be used however in order to optimally match them to particular functional requirements of a given bumper system.

The configuration and orientation of ribs in concavities of a given S-shaped section affects beam strength and mass. In particular, straight ribs (i.e., ribs that extended perpendicular across the concavity of the S-shaped section) (mass of 645 g) resulted in lower total mass of the beam than the beam with angled ribs (mass of 684 g). Also, when equal-weight beams were compared, the "S" beam with straight ribs (mass 684 g) was stronger (127.5 J) than the beam with angled ribs (mass 684 g) (121 J).

It is noted that the addition of ribs to a beam design increases the amount of force that the cross beam can absorb during an impact. This can be important for a cross beam when used as the primary reinforcement beam in a vehicle bumper system. At the same time, our testing shows that the ribs are not as important when the beam is used as a secondary beam intended to meet criteria for pedestrian impact for reduced pedestrian injury. Specifically, our testing trials and experimentation show that the addition of the ribs to a "pedestrian" beam having an S-shaped cross section (i.e. a beam designed for pedestrian impact) has less effect on meeting the target criteria for typical low-injury pedestrian impact. Restated, the addition or deletion of the stiffening ribs to a beam with S shape will have a relatively smaller affect on meeting the pedestrian lower leg impact criteria, but the addition of the ribs to a beam with S shape remains important to the overall performance in a primary beam.

FIGS. 1-2, 3-4, 5-6, 7-8, and 12-13 are front and rear perspective views of different beams 20, 20A, 20B, 20C, and 20D. Beam 20 includes ends 21 with an apertured flat rear surface adapted for attachment to crush cans 22 (FIG. 1) which are in turn attached directly to a vehicle frame 23, and includes a cross beam portion 24 between the ends 21. The cross beam portion 24 has an S-shaped cross section (see FIG. 1A) which includes walls 30-32 connected by radiused portions 33-34. Vertical spaced-apart ribs 35-36 extend across the concavities formed by the S-shaped cross section. As can be seen by comparing beams 20-20D, the ribs can be straight ribs (see FIGS. 1-4) or angled ribs (FIGS. 7-8, 12-13). Notably, the ribs can be tailored to meet particular beam requirements, such as including angled ribs for increased lateral support if the expected impact is at an angle to a longitudinal length of the vehicle. Beams 20A and 20D include similar end structure to beam 20. (I.e., they attach to crush cans). Beams 20B and 20C incorporate a structure 22B and 22C into their ends 21B and 21C that eliminates the need for the separate crush cans 22.

Beams 20, 20A and 20D (FIGS. 1-4 and 12-13) include separate metal crush cans 22, 22A, and 22D while the beams 20B and 20C (FIGS. 5-8) include integrally formed crush can structures 22B and 22C. The crush can selection is influenced by a strength of impact resistance required of the beam (such as for vehicle impact resistance or for pedestrian first-level impact resistance), as well as the expected direction of impact (i.e., the need for lateral stability and resistance to sidewardly shifting of the beam during an impact). The metal crush cans 22, 22A, and 22D are believed to be particularly useful where support to a primary beam is necessary, since the technology for metal crush cans is relatively well-developed, and since metal crush cans provide considerable structural stability and strength (in longitudinal and lateral directions). The illustrated metal crush cans 22, 22A and 22D include a larger tubular end, smaller tubular end, and an intermediate joining region designed to cause the tubular ends to telescope into each other with rolling material deforming in a predictable and consistent manner for maximum energy absorption and efficiency. However, it is noted that the integral crush can structures 22B and 22C are integrally formed and hence lower cost, both for manufacturing and less assembly. The illustrated crush can structures 22B and 22C include longitudinally-extending "column" ribs as well as transverse ribs placed and arranged in a honeycomb-like arrangement for stability, structure, and beam strength.

Figures 9, 10:
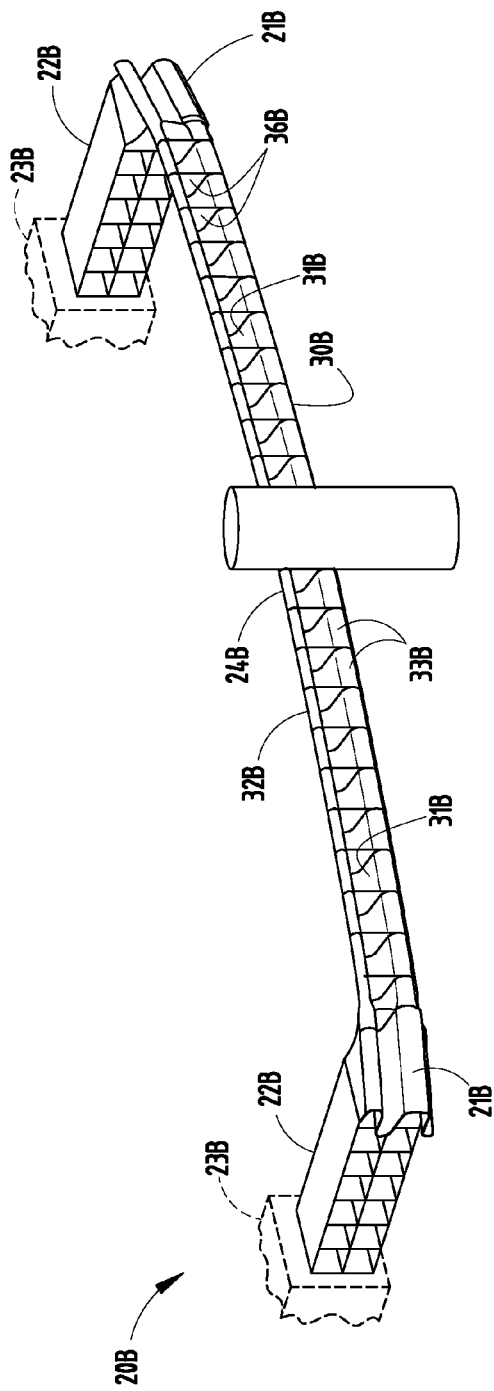
FIG. 9 is a perspective view of a rigid pole impact test using the beam of FIGS. 5-6.
FIG. 10 is chart comparing the mass of different "S" beams tested, the beams having similar cross-sectional areas in terms of height and depth.
Figure 11:
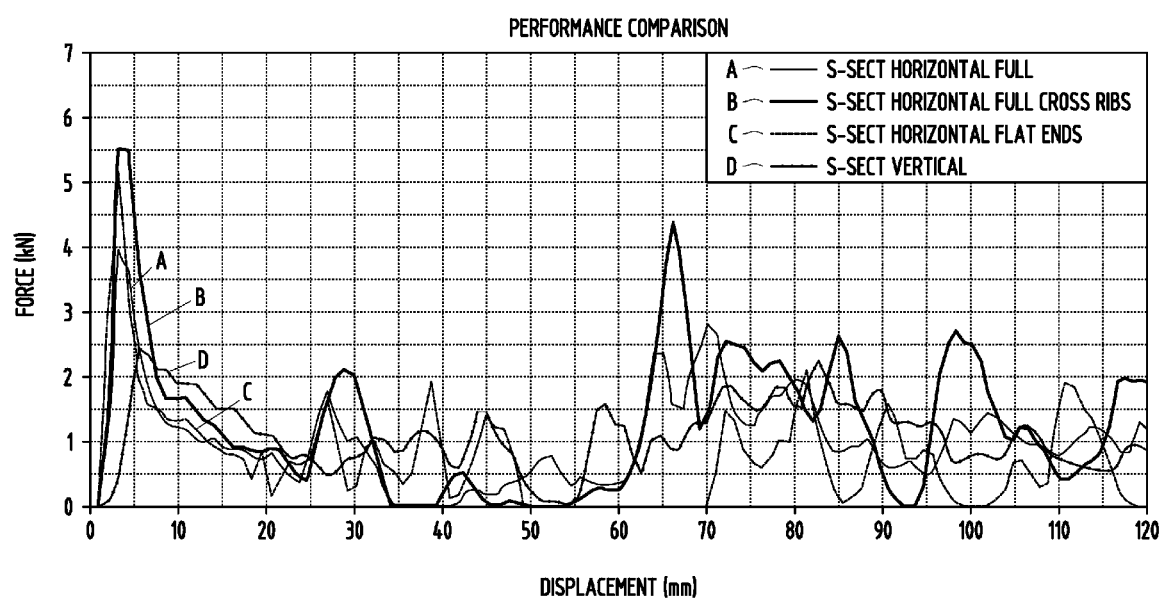
FIG. 11 is a graph of force versus deflection in a pole test for various beams shown in FIG. 1-8.
Figure 12:
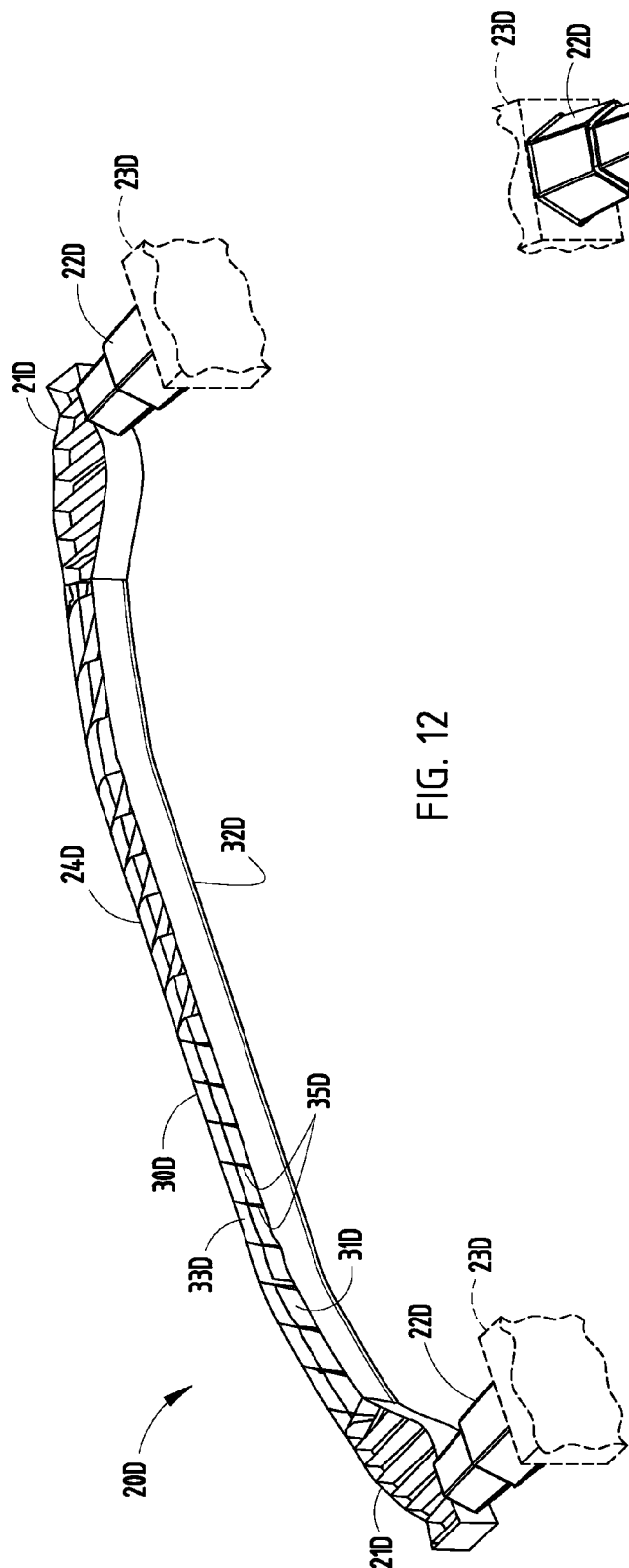
Figure 13:
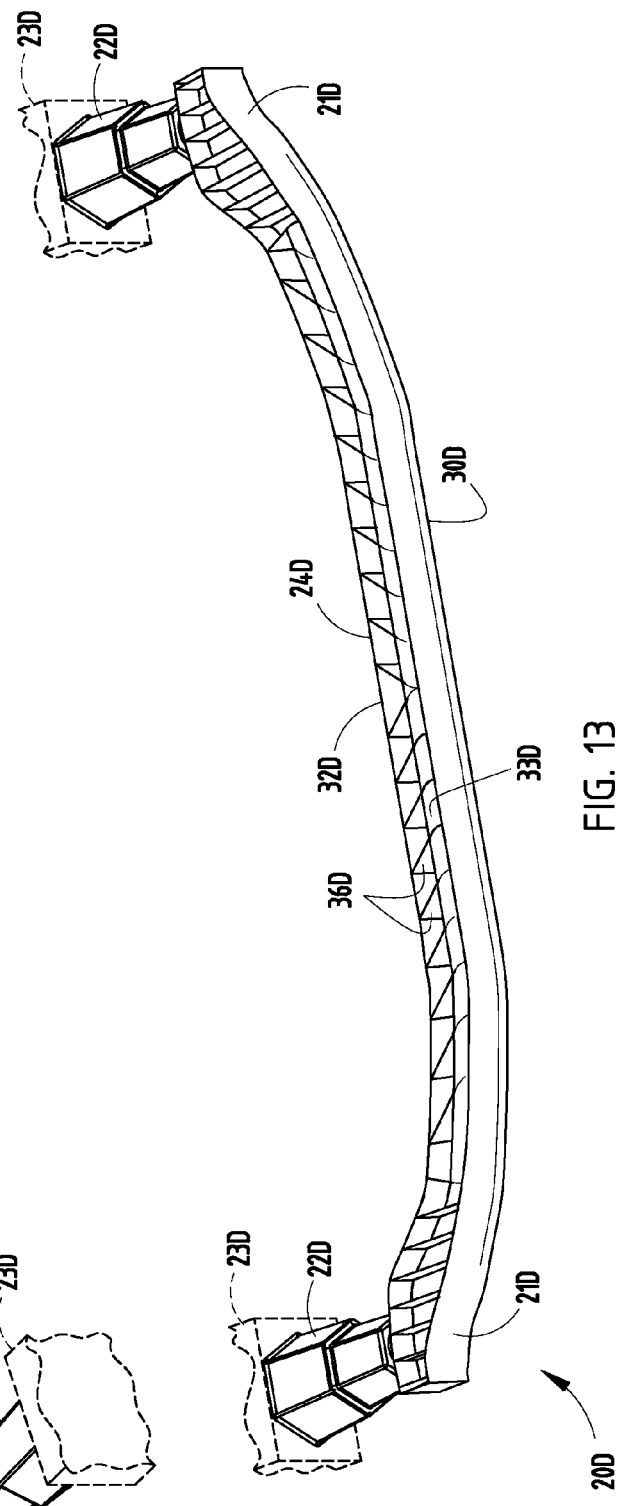

FIG. 9 is a perspective view of a rigid pole impact test, where a pole in impacted by a vehicle frame carrying the beam 20 (or beams 20A-20D). (Alternatively, the pole may be mounted on a swinging pendulum to cause a similar impact on a stationary vehicle.) FIG. 10 discloses a comparison of weights, where beams having a similar basic cross-sectional size and longitudinal shape are compared. Four of the beams tested had an S-shaped cross-sectional beam shape but with different rib arrangements and two additional beams had a U-shaped section and an I-shaped section, respectively. The impact results for the four beams having an S-shaped cross section are shown in FIG. 11. Additional testing was also done, including FEA review (finite element analysis). We, the inventors, believe the test results show that an S-shaped beam gave surprising and unexpected results, especially when considering impact efficiency, which considers beam strength, beam weight, and beam strength-to-weight ratio. Notably, for a direct longitudinal impact, the beam section referred to as "A" in FIG. 11 in particular gave excellent, surprising and unexpected results.

FIG. 10 illustrates generally how the addition of ribs and/or modification of ends of the beam and/or modification of its cross-sectional shape can affect its weight. Of course, specific weights will vary depending on rib density, rib angle and orientation, rib thickness and extent, and related factors. FIG. 11 shows a comparison of force versus deflection for the S-shaped beams. Notably, the rib structure greatly affects an initial beam strength, and then also affects both individual load peaks and also overall energy absorption.

The beam 20D (FIGS. 12-13) is not unlike the beam 20 (FIGS. 1-2), but beam 20D includes a plurality of angled ribs along its center region, with all ribs 35D-36D on one (right hand) side extending from a front and center of the beam rearwardly at an outward angle toward the adjacent side of the vehicle, and with all ribs 35D-36D on the other (left hand) side extending from a front and center of the beam at an outward angle rearwardly in an opposite direction (toward the adjacent side of the vehicle). The ribs 37D on the ends 21D extend generally parallel a longitudinal direction for optimal energy transfer and strength over the crush cans 22D. Also, the illustrated ends 21D transition from an S-shaped cross section (in a center of the beam 20D) to an I-shaped section (i.e., front and rear parallel walls 38D-39D with a longitudinal wall 40D extending between the front and rear parallel walls to form an I beam shape) and with the ribs 37D in the ends 21 being oriented and positioned to stabilize the walls 38D-40D of the I beam shape.

FIGS. 14-16 illustrate a beam 20E similar to beam 20 (FIGS. 1-2) but with a different cross-sectional shape more adapted for pedestrian safety. The beam 20E includes integral mounting structure 22E that transitions from the S-shaped cross section of a center portion of the beam 20E to a mounting structure with stiffening perimeter rib, triangular center rib, holes for receiving mounting screws, and a snap-attachment structure to facilitate mounting to a vehicle. Specifically, the beam 20E is designed for improved pedestrian impact, where the beam 20E is made from PC/PBT or glass reinforced PP such as DLFT polymeric material, and has an S-shaped cross section along a majority of its length, but where end sections 21E are shaped to form mounting/attachment structure 22E for attaching the beam 20E to a bracket 23E extending from the vehicle's frame or rail tip. The S-shaped cross section includes fore-aft walls 30E, 31E, 32E, and top curved connecting wall 33E and bottom curved connecting wall 34E. Vertical ribs 35E and 36E provide additional rigidity to the beam 20E, and assist in keeping the walls 30E-34E from opening up during an impact. Notably, the bottom wall 32E has an undulation 40E that positions a rear portion of the wall 32E lower than a front portion of the wall 32E, with the front and rear portions being relatively planar and with a length of the beam being slightly longitudinally curved (but relatively straight).

Figure 17:
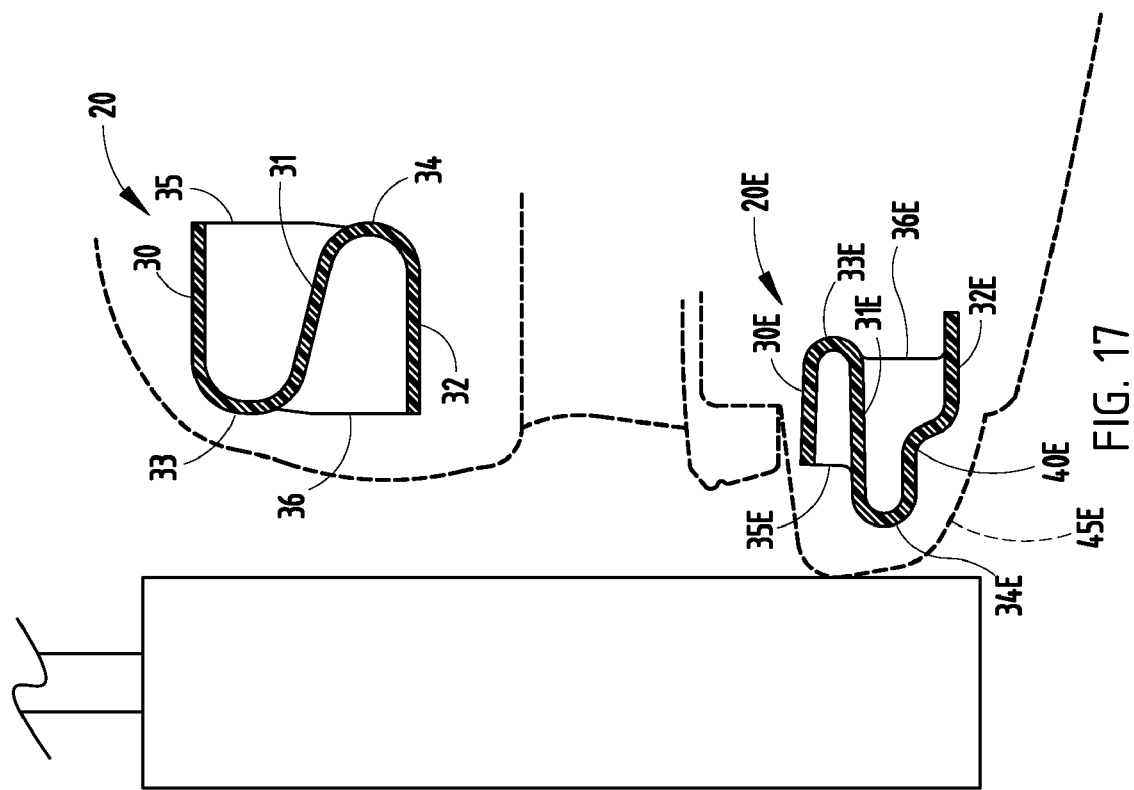
FIG. 17 is a side view showing a pole impact against the structure of FIG. 16.

FIG. 17 shows a relation of the S-shaped cross section of beam 20E to a vehicle's RRIM fascia component 45E. The beam 20E is shaped in such a way that a stiffest portion of the S section lies in a most car-forward position and at a lowest position relative to a rest of the vehicle. The bumper system also includes the vehicle's primary beam 20 (the primary beam's face being above and equal to or rearward of a front face of the beam 20E). For purposes of illustration, the primary beam 20 is like that beam shown in FIG. 1-2, but it is contemplated that a variety of different beam cross sections can be used in place of the illustrated beam. The relative fore-aft placement of the primary and secondary beam cause the beam 20E to engage a pedestrian leg strategically sooner and at a lower location on the pedestrian's leg than the primary beam, which is turn results in improved pedestrian safety due to how the pedestrian's leg(s) and body takes the impact (i.e., "pedestrian impact criteria"). In particular, the timing and placement of the bumper's impact against a pedestrian's leg greatly affects the injury resulting, including the degree to which the person's leg(s) are forcibly bent and also how the person "falls" during the impact.

Notably, the primary beam 20 and secondary beam 20E in FIG. 17 can be made of different material and have different cross-sectional shapes. For example, the illustrated beam 20 is made from glass filled nylon, while the lower beam 20E is made from PC/PBT or glass filled PP such as DLFT material. Another reason for different cross-sectional sizes of the two beams 20 and 20E is due to functional and aesthetic reasons, such as the package space allowed by the vehicle's designer.

FIG. 14 illustrates the ends 21E of beam 20E including the mounting/attachment structure 22E for attaching the beam 20E to a vehicle frame rail 23E. The ends 21E include a transitioning portion that includes an end wall 50E closing an end of the S-shaped portion of the beam 20E, and further include a C channel section with flat mounting plate 51E and a perimeter flange 52E that extends around the plate 51E and that connect to the top and bottom walls 30E and 32E. An enlarged triangular-shaped rib 53E extends longitudinally from the center wall 31E to an outer end of the plate 51E. The rib 53E is triangularly shaped, with a large end connecting to the center section of the beam 20E and a smaller end on an outboard side. Further, the center section of the beam 20E is forwardly curved (i.e., "swept") to match an aerodynamic curved shape of a front of a vehicle. However, it is contemplated that the beam can be linear and not longitudinally curved. The rib 53E acts in combination with the perimeter flange 52E to provide a "triangulated" load path from the S-shaped center section of the beam 20E into its attachment structure 22E, where the "triangulated" load path handles distribution of stress from the center section to the ends and to the attachment structure in an optimal.

Figure 20:
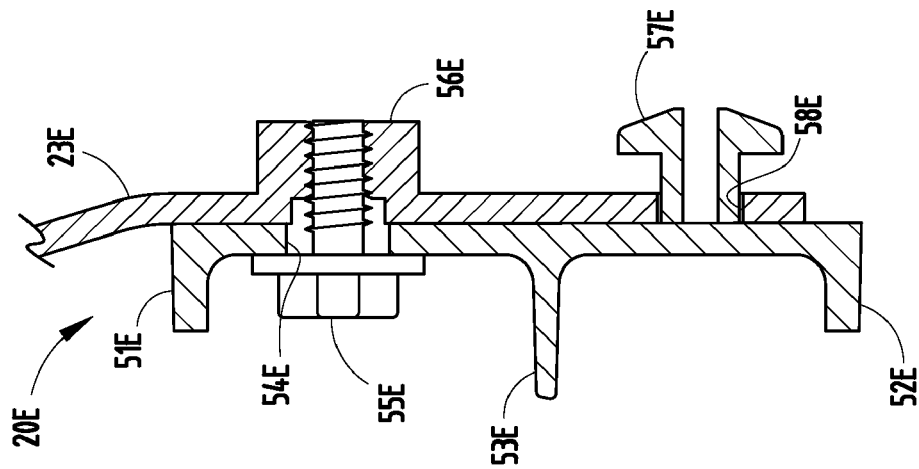
FIG. 20 is an enlarged cross-sectional view of an end of the beam in FIG. 19, showing its attachment structure.

The attachment structure 22E on the beam 20E includes the mounting plate 51E (FIG. 20), which has details for attaching the beam 20E to the bracket 23E. The illustrated attachment structure 22E has a top hole 54E (see FIG. 20) that receives a bolt 55E threaded into a nut 56E on the vehicle frame bracket 23E, and further includes snap-attach fastener prongs 57E configured to snap-fit into a hole 58E in the bracket 23E. By attaching the prongs 57E first, this allows for a quick and secure assembly to the vehicle frame, with a minimum amount of assembly time. It is also contemplated that other attachment structures can be designed, such as a mounting structure that hooks in at a top location and then snaps into position. The bracket 23E extends vertically downwardly from the vehicle frame, at top of the bracket 23E being attached to the frame and a bottom of the bracket 23E being secured to the beam 20E.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A bumper system for providing impact resistance on a vehicle frame, comprising:
   a structural beam with end-positioned mounts configured for attachment to the vehicle frame, the structural beam having an S-shaped cross section consisting of a single forwardly-facing free end and a single rearwardly-facing free end and having a length that extends about equal to a width of a vehicle.

2. The bumper system defined in claim 1, wherein the beam includes polymeric material.

3. The bumper system defined in claim 1, wherein the beam comprises a primary reinforcement beam on a front of a vehicle.

4. The bumper system defined in claim 1, including a primary beam, and wherein the structural beam comprises a secondary beam positioned under the primary beam.

5. The bumper system defined in claim 1, including crush cans engaging and supporting the mounts.

6. The bumper system defined in claim 1, wherein the beam defines at least one forwardly-facing concavity that, when the beam is in a vehicle-mounted position, is at a top of the cross section.

7. The bumper system defined in claim 1, wherein the S-shaped cross section includes a forwardly facing concavity and a rearwardly facing concavity, and wherein the beam has transverse stiffening ribs located within and extending across each of the concavities defined by the cross section.

8. The bumper system defined in claim 7, wherein the stiffening ribs include vertical and diagonal ribs.

9. The bumper system defined in claim 1, wherein the crush cans are integrally formed on ends of the beam and form a part of the mounting structure.

10. A bumper apparatus comprising:
    a primary reinforcement beam designed for major impact collisions against a relatively heavy or stationary object; and
    a secondary beam designed for pedestrian impact and positioned below the primary reinforcement beam in a position to act as a leg catcher for improved pedestrian safety;
    at least one of the primary and secondary beams having an S-shaped cross section consisting of a single forwardly-facing free end and a single rearwardly-facing free end and a cross-car width generally matching a vehicle width.

11. The bumper apparatus defined in claim 10, wherein the secondary beam includes polymeric material and includes
    a pair of separate crush cans supporting ends of the secondary beam and adapted for mounting to a vehicle frame in a position for improved impact safety.

12. The beam apparatus defined in claim 11, wherein the crush cans are made of metal.

13. The beam apparatus defined in claim 11, wherein the crush cans each include plastic material.

14. The beam apparatus defined in claim 10, wherein the S-shaped section defines a forwardly facing top concavity.

15. The bumper system defined in claim 1, wherein the S-shaped cross section also consists of three horizontal walls and two radiused interconnecting walls.

16. The bumper system defined in claim 10, wherein the S-shaped cross section also consists of three horizontal walls and two radiused interconnecting walls.

* * * * *